Figure 2:
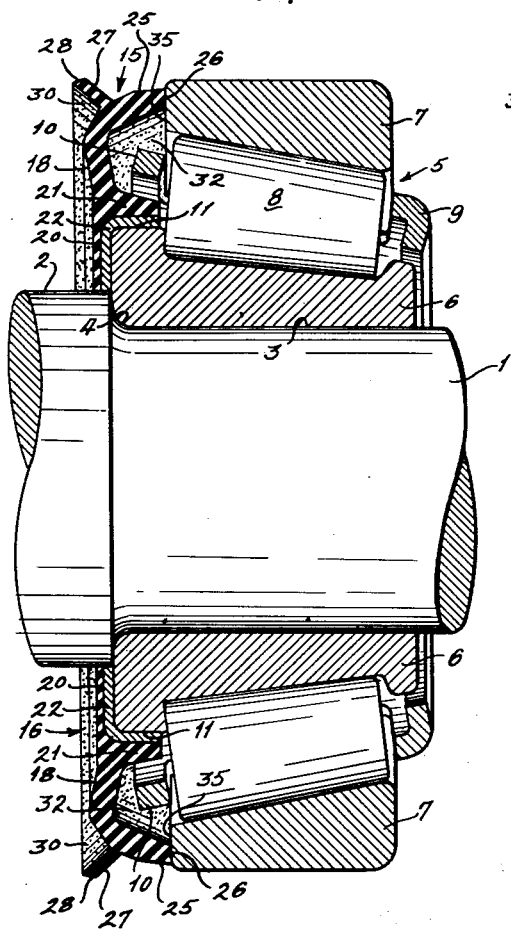

Oct. 31, 1961  G. W. CURTIS  3,006,701
SEAL
Original Filed Oct. 5, 1954  2 Sheets-Sheet 1

INVENTOR.
GEORGE W. CURTIS
By Gravely, Lieder, Woodruff &
Wills ATTORNEYS.

Oct. 31, 1961    G. W. CURTIS    3,006,701
SEAL

Original Filed Oct. 5, 1954    2 Sheets-Sheet 2

INVENTOR.
GEORGE W. CURTIS
By Gravely, Lieder, Woodruff &
Wills    ATTORNEYS.

United States Patent Office 3,006,701
Patented Oct. 31, 1961

3,006,701
SEAL
George W. Curtis, Fort Myers, Fla., assignor to The Timken Roller Bearing Company, Canton, Ohio, a corporation of Ohio
Continuation of application Ser. No. 460,480, Oct. 5, 1954. This application June 17, 1958, Ser. No. 742,975
9 Claims. (Cl. 308—187.1)

This application relates generally to the bearing art, and is more particularly directed to a novel seal.

This application is a continuation of my co-pending application Serial No. 460,480, filed October 5, 1954 and entitled "Seal," now abandoned.

The most effective seals have a sealing surface in contact with a relatively movable element, the seal being under considerable unit pressure to effect the engagement of its sealing surface with the cooperating surface of the element. A hazard to seal life and efficiency results from the pressure of the seal inasmuch as perfect seal contact would cause the sealing surface to run dry and such condition would result in the scoring of the sealing surface and the early destruction of the seal. To obviate the damage which would result from a dry seal, lubricant must be provided to the sealing surfaces at least during the initial running period.

It is an object of this invention to provide a seal having multiple sealing surfaces, one of which is in constant sealing engagement with a relatively movable element and another of which will move into sealing engagement during the operation of the sealed structure.

Another object of this invention is to provide a seal having a sealing surface which comes into contact with its cooperating sealing surface during operation and exerting a light pressure initially and gradually developing a heavier seal pressure during normal operation.

Still another object is to provide a seal having multiple sealing surfaces with an annular lubricant retaining groove therebetween.

A further object of this invention is to provide a seal having multiple sealing surfaces, one of which has a radial type sealing action and another of which has an axial type sealing action, with the former tending to prevent the latter from sealing during initial operation.

A still further object is to provide a seal which may be positioned on the cone or inner race of a tapered roller bearing and having a sealing surface in rubbing contact against the end face of the cup or outer race of the bearing.

These and other objects and advantages will become apparent hereinafter.

The invention is embodied in a seal positioned on the inner race of a bearing and having multiple sealing surfaces adapted for spaced sealing engagement with the relatively rotatable outer race of the bearing and with the housing in which said bearing is mounted.

Figure 1:
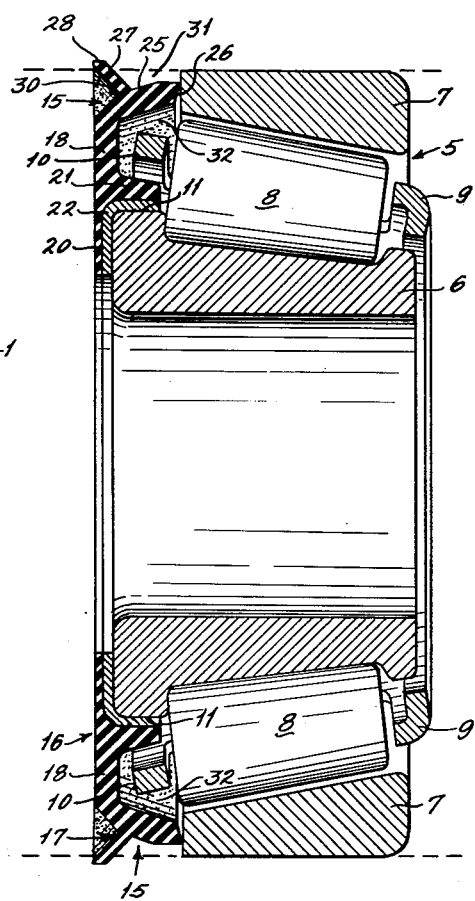
Figure 3:
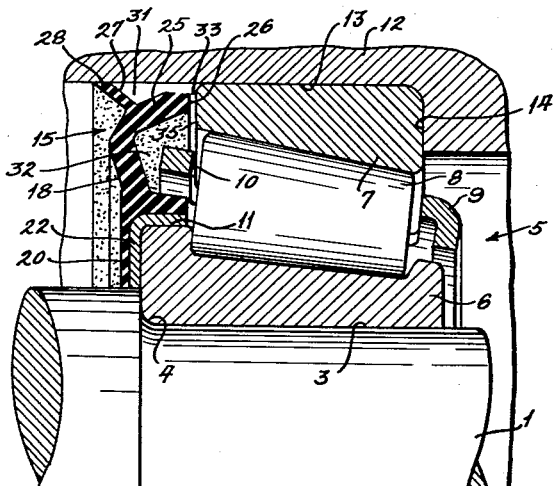
Figure 4:
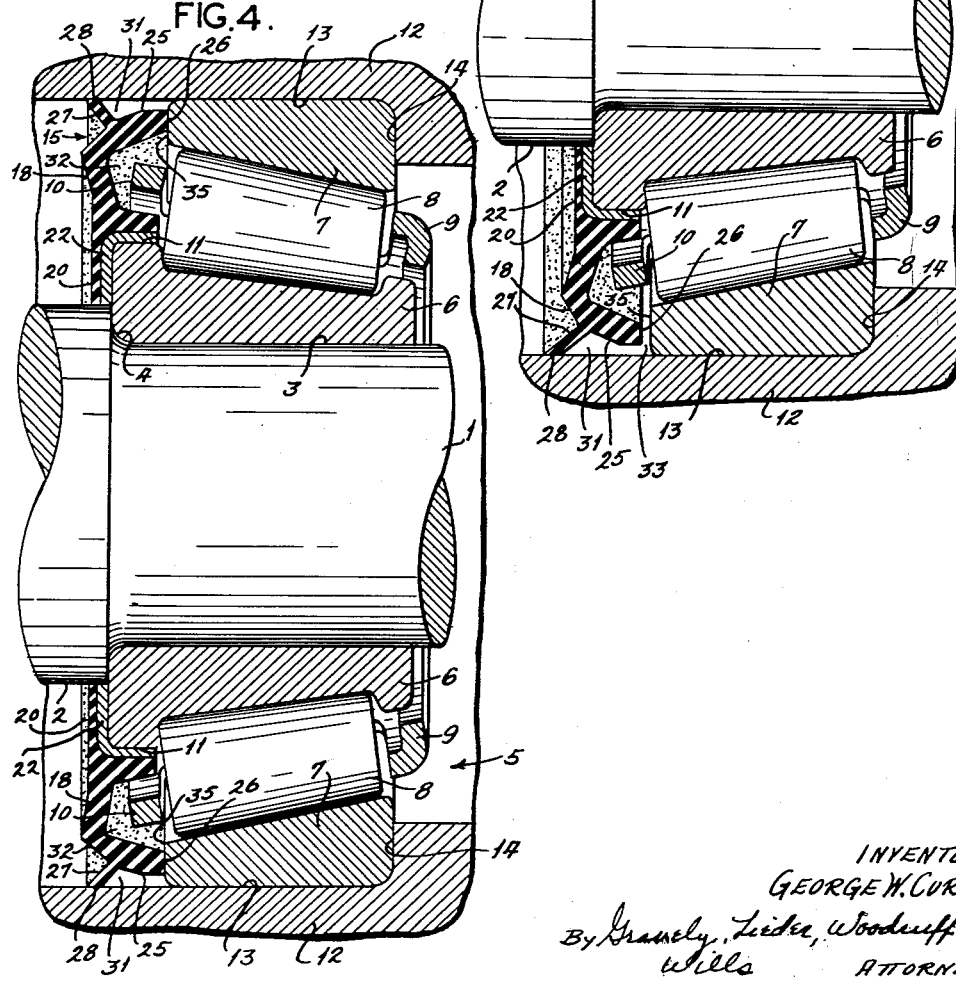

The invention also consists in the parts and in the arrangements and combinations of parts hereinafter described and claimed. In the accompanying drawings, which form a part of this specification and wherein like numerals refer to like parts wherever they occur:

FIG. 1 is a vertical cross-sectional view of a seal positioned on the inner race of a bearing with the rollers out of contact with the outer race, FIG. 2 is a vertical cross-sectional view similar to FIG. 1, but showing the rollers in running contact with said outer race, FIG. 3 is a vertical cross-sectional view similar to FIG. 2, but showing the seal and bearing enclosed in a housing and ready for initial operation, and FIG. 4 is a vertical cross-sectional view similar to FIG. 3, but showing the normal operating position of the seal after the initial running period.

The invention is illustrated as applied to a rotatable axle or shaft 1 having a large end 2 and a reduced end 3 with a shoulder 4 therebetween. Mounted on the reduced end 3 is a tapered roller bearing 5 having an inner race or cone 6 and an outer race or cup 7, and a plurality of tapered rollers 8 therebetween. The rollers 8 are disposed in the openings of a cage 9 whose large end ring 10 overhangs the thrust rib 11 of the cone 6. The outer race 7 of the bearing is mounted within a bearing housing 12 (FIGS. 3 and 4) having an annular inner wall or bore 13, which forms into an annular vertical wall 14.

The invention comprises a resilient annular sealing member 15 for the retention of lubricant within the bearing 5 and the exclusion of dirt and moisture therefrom. The sealing member 15 comprises an annular mounting portion 16 and an annular sealing portion 17, which are connected by an annular diaphragm or web 18.

The mounting portion 16 preferably includes a radially extending flange 20 and an axially extending flange 21 formed integral therewith. A mounting member 22 adapted to take a press fit on the thrust rib 11 of the cone 6 may be provided to position the sealing member 15 relative to the bearing 5. The mounting member 22 is generally L-shaped in cross section and may be molded or vulcanized into the flanges 20 and 21 of the mounting portion 16 as one means of establishing a seal between the mounting portion 16 and the cone 6. Inasmuch as the mounting portion 16 is provided to rigidly secure the sealing member 15 in fixed position on the cone 6, it is apparent that it may be modified extensively without departing from the teachings of the present invention. When the bearing 5 and sealing member 15 are positioned on the shaft 1, the cone 6 of the bearing 5 is mounted on the reduced end 3 of the shaft 1 and has its thrust rib end in abutting relation with the shoulder 4 of the shaft 1. The inner edges of the radially extending flange 20 and the radial portion of the mounting member 22 are positioned adjacent to the large end 2 of the shaft 1. The sealing member 15 is maintained in rotational relation with the shaft 1 by the positioning of its mounting portion 16 on the cone 6.

The diaphragm or web 18 is formed on the axial flange 21 of the mounting portion 16 adjacent to the radial flange 20 and extends radially outwardly therefrom. The outer peripheral portion of the web 18 is formed into the sealing portion 17 thereby connecting the mounting portion 16 and the sealing portion 17 in one integral annular sealing structure.

The annular sealing portion 17 of the sealing member 15 includes an axially extending sealing ring or flange 25 having one end formed into the diaphragm 18 and having a sealing lip or annular land 26 provided on its unattached end adjacent to the outer race 7. Projecting from the sealing ring 25 adjacent to the diaphragm 18 is a radially extending annular sealing ring or flange 27 having an outer sealing lip or annular land 28. The functions of the multiple sealing rings 25 and 27 will become apparent hereinafter.

An annular V-shaped groove 30 is provided between the radial sealing flange 27 and the diaphragm 18 of the sealing member 15 to increase the flexibility of the radial sealing flange 27 relative to the diaphragm 18. Another annular groove or space 31 is formed between the axial sealing flange 25 and the radial sealing flange 27 to retain lubricant for the sealing lips 26 and 28 during the operation of the seal. The axial sealing flange 25 is spaced radially from the axial flange 21 of the mounting portion 16, thereby providing a circumferential opening 32 adjacent the rollers 8 and in which lubricant is retained for the bearing 5 and which provides running space for the large end ring 10 of the conical bearing cage 9.

As shown in FIG. 1, when the resilient sealing member 15 is in its normal relaxed position, the radial sealing ring 27 extends outwardly, the annular land 28 on its outer end having a larger diameter than the inner wall or bore 13 of the bearing housing 12 (indicated in dashed lines). Furthermore, the sealing lip 26 of the axial sealing ring 25 bears against a cooperating end sealing surface 35 on the bearing cup 7 thereby holding it away from operating position relative to the rollers 8.

In FIG. 2, the bearing 5 and sealing member 15 have been positioned on the axle 1 and the bearing cup 7 has been moved into operating position with the rollers 8. When so positioned the sealing member 15 has an axial pressure exerted on it through the axial sealing ring 25 by the bearing cup 7, thereby causing the diaphragm 18 to be slightly deformed. This pressure between the bearing cup 7 and the sealing member 15 represents the sealing pressure of the axial sealing ring 25 during actual operation as will be seen hereinafter.

FIG. 3 shows the bearing housing 12 secured in place around the bearing 5 and the sealing member 15, thereby causing the radial sealing ring 27 to be forced inwardly because of the radial interference of the inner wall 13 of the bearing housing 12 with the annular land 28. The annular vertical wall 14 of the bearing housing 12 is formed to cooperatively engage the large end of the outer race 7 so as to maintain it in operating position relative to the rollers 8. When the radial sealing flange 27 is forced inwardly, the diaphragm 18 is further deformed so as to exert an outward radial pressure on the radial sealing flange 27 and causing its sealing lip 28 to bear against the inner wall 13 of the bearing housing 12 in sealing engagement therewith. This deformation of the diaphragm 18 causes the sealing lip 26 of the axial sealing flange 25 to be moved out of contact with the bearing cup 7 so as to provide a space 33 therebetween. The space 33 connects the circumferential opening 32 with the annular space 31 so as to permit the passage of lubricant therebetween. It is apparent that the space or gap 33 between the sealing lip 26 and the bearing cup 7 will continue to exist only as long as the initial high radial pressure between the annular land 28 and the bearing housing 12 is present.

FIGS. 3 and 4 illustrate the relation of the sealing member 15 to the bearing 5 before initial operation and in normal operating positions respectively. When the axle 1 is initially set into operation, the bearing cone 6 and the sealing member 15 rotate with it, thereby causing relative rotation between the sealing lips 26 and 28 and their cooperating sealing surfaces on the end sealing surface 35 of the bearing cup 7 and the inner wall 13 of the bearing housing 12. The inner wall 13 is relatively rough for sealing contact and the radial pressure of the annular land 28 thereagainst causes a rapid lapping action to take place, thereby decreasing the radial pressure between the inner wall 13 and the sealing lip 28. As the radial pressure decreases, the stress in the diaphragm 18 decreases allowing the sealing flange 25 to move axially toward the bearing cup 7 until its sealing lip 26 is in sealing engagement with the end sealing surface 35 thereon.

It is apparent that the axial pressure developed between the sealing lip 26 and the bearing cup 7 will develop gradually as the pressure between the annular land 28 and the bearing housing 12 decreases so that any roughness of the sealing lip 26 will have time to wear off before the full sealing pressure develops between the lip 26 and the cup 7. Further, the passage of lubricant through the space 33 has caused the sealing lip 26 to be lubricated while being smoothed by the light rubbing contact with the cup 7 so that when full pressure develops therebetween, the sealing lip 26 has been lubricated for long life.

It is also apparent that the present sealing construction 15 may be used in other bearing constructions or for sealing against other relatively rotatable parts, and that the precise cup 7 and bearing housing 12 are shown only by way of illustration.

This invention is intended to cover all changes and modifications of the example of the invention herein chosen for the purposes of the disclosure, which do not constitute departures from the spirit and scope of the invention.

What I claim is:

1. A sealing member comprising a radially extending diaphragm, a mounting portion formed on the inner end of said diaphragm, said mounting portion including a radially extending flange and an axially extending flange, a sealing portion formed on the end of said diaphragm radially outwardly from said mounting portion, said sealing portion including an axially extending sealing ring formed on said diaphragm, a radially extending sealing ring formed on said axially extending sealing ring adjacent said diaphragm, an annular groove formed between said radially extending sealing ring and said diaphragm, a second annular groove formed between said radially extending sealing ring and said axially exending sealing ring, and a third annular groove formed between said axially extending sealing ring and said axially extending flange of said mounting portion adjacent to said diaphragm.

2. A resilient annular sealing member comprising an annular mounting portion adapted to be rigidly positioned on the inner race of a bearing, said mounting portion including an axially extending flange, a flexible annular diaphragm formed on one end of said axially extending flange of said mounting portion and extending radially outwardly therefrom, a sealing portion formed on the outer peripheral end of said diaphragm, said sealing portion including a first annular sealing ring formed on said diaphragm and extending axially therefrom in spaced relation with said axially extending flange of said mounting portion, said first sealing ring having an end sealing lip adapted to sealably engage an end of the outer race of a bearing, said sealing portion including a flexible second annular sealing ring formed on said first sealing ring and extending radially outwardly therefrom, said second sealing ring having an end sealing lip adapted to sealably engage a bearing housing for enclosing said sealing member, and an annular groove between said second sealing ring and said diaphragm whereby the flexibility of said second sealing ring is increased relative to the flexibility of said diaphragm.

3. A sealing member and a bearing mounted on a shaft and enclosed by a bearing housing, said bearing having an inner race and an outer race with a plurality of rollers therebetween, said sealing member comprising a mounting portion including an axial flange positioned on said inner race adjacent said rollers, a web formed on one end of said axial flange of said mounting portion and extending radially outwardly therefrom, a sealing portion formed on the outer end of said web and including an axially extending sealing ring spaced from said axial flange of said mounting portion so as to form a circumferential opening therebetween, said axial sealing ring having an end sealing lip for sealing engagement with said outer race of said bearing, said sealing portion including a radially outwardly extending sealing ring formed on said axial sealing ring, said radial sealing ring having an end sealing lip for sealing engagement with said bearing housing.

4. An annular sealing member and a bearing mounted on a shaft and enclosed by a bearing housing, said bearing having an inner race and an outer race, said sealing member comprising an annular mounting portion having an axial flange positioned on the inner race of said bearing, an annular web formed on said mounting portion at one end of said axial flange and extending radially outwardly therefrom, an annular sealing portion formed on the outer end of said web, said sealing portion including a first annular sealing ring formed on said web and extending axially therefrom in spaced relation with said axial flange of said mounting portion, said first sealing ring having an annular sealing lip in abutting relation with said outer race of said bearing, said annular sealing portion including a second annular sealing ring formed on said first sealing ring and extending radially outwardly therefrom, said second sealing portion having a sealing lip in abutting relation with said bearing housing.

5. In combination, a bearing comprising an inner race having a thrust rib end, an outer race spaced from said inner race, a plurality of rollers between said inner and outer races, said rollers being maintained in spaced alignment by a cage, said bearing being mounted on a shaft having a large end and a reduced end with a shoulder therebetween, said inner race of said bearing being positioned on said reduced end of said shaft and having its thrust rib end in abutting relation with said shoulder, said bearing being enclosed by a bearing housing having an inner wall abutting said outer race of said bearing; and an annular sealing member comprising an annular mounting portion having an axial flange positioned on said thrust rib end of said inner race, said mounting portion having a radial flange extending inwardly from said axial flange and adjacent to said thrust rib end of said inner race, an annular diaphragm formed on said axial flange of said mounting portion adjacent to said radial flange and extending radially outwardly therefrom, an annular sealing portion formed on said diaphragm in spaced relation to said mounting portion, said sealing portion including an annular sealing ring extending axially from said diaphragm, said axial sealing ring having a sealing lip formed thereon for sealing engagement with said outer race, said sealing portion including an annular sealing ring formed on said axial sealing ring and extending radially outwardly therefrom, said radial sealing ring having a sealing lip formed thereon in sealing engagement with said inner wall of said bearing housing, said axial sealing ring being spaced from said axial flange so as to form a circumferential opening therebetween adjacent to said rollers and in which said cage is positioned.

6. An annular sealing member comprising a radially extending diaphragm having an inner and an outer end, an axially extending mounting flange formed on the inner end of said diaphragm, a radially extending mounting flange formed on said axially extending mounting flange adjacent to said diaphragm formed thereon, a rigid L-shaped mounting member secured to and maintaining said axial and radial mounting flanges in fixed angular relationship, an axially extending sealing ring formed on the outer end of said diaphragm, a radially extending sealing ring formed on said axially extending sealing ring adjacent to said diaphragm, each of said sealing rings having sealing faces formed on their unattached ends, said axially extending sealing ring being spaced from said axially extending mounting flange so as to form an opening therebetween.

7. A resilient sealing member comprising a first portion in rigid sealed attachment on a first element, a second portion having a first sealing lip adapted to sealably contact a second element movable relative to said first element and a second sealing lip in sealing contact with a third element movable with said second element, said first sealing lip moving into sealing contact with said second element after said second sealing lip has been in running contact with said third element for a predetermined time, and a third portion interconnecting said first and second portions.

8. A resilient annular sealing member comprising a mounting portion adapted to be rigidly positioned on the inner race of a bearing, a flexible diaphragm formed integral with said mounting portion and extending radially outwardly therefrom, a sealing portion formed integral with said diaphragm in radial spaced relation with said mounting portion to form an annular channel, said sealing portion including a first sealing ring having a first end sealing lip adapted to be positioned in sliding contact with the outer race of the bearing and a second sealing ring having a second end sealing lip adapted to be positioned in sliding contact with a bearing housing, said sealing rings being angularly related so that the contact of the second end sealing lip with the bearing housing will prevent contact of the first end sealing lip on the outer race of the bearing until a predetermined amount of wear on said second end sealing lip is effected.

9. In combination, a bearing comprising an inner race having a thrust rib and an outer race spaced from said inner race by a plurality of rollers, said bearing being mounted on a shaft having a large end and a reduced end with a shoulder therebetween, said inner race being positioned on said reduced end with the thrust rib in abutting relation with said shoulder, said bearing being enclosed by a bearing housing having an inner wall abutting said outer race, and a resilient annular sealing member comprising rigidified mounting means fixedly attached to said thrust rib of said inner race, flexible diaphragm means integrally formed with said mounting means and extending radially outwardly therefrom, flexible sealing means integrally formed with said diaphragm means in spaced relation with said mounting means, said sealing means including a first sealing member having an end sealing lip in slidable sealing contact with said bearing housing to deform said diaphragm means, a second sealing member having an end sealing lip held in spaced relation from the outer race by the deformation of said diaphragm means, said bearing housing and outer race being rotatable relative to said sealing means whereby rapid wear will be effected on the end sealing lip of said first sealing member to cause said diaphragm means to move the end sealing lip of said second sealing member into slidable sealing contact with said outer race.

References Cited in the file of this patent

UNITED STATES PATENTS

| | | |
|---|---|---|
| 519,521 | Bulgiano | May 8, 1894 |
| 2,350,697 | Petch | June 6, 1944 |
| 2,518,829 | Smith | Aug. 15, 1950 |
| 2,523,604 | Vedovell | Sept. 26, 1950 |
| 2,560,557 | Curtis | July 17, 1951 |
| 2,598,094 | Augereau | May 27, 1952 |
| 2,657,104 | Kayser | Oct. 27, 1953 |
| 2,676,041 | Englesson | Apr. 20, 1954 |
| 2,702,203 | Sefren | Feb. 15, 1955 |
| 2,743,950 | Helfrecht | May 1, 1956 |
| 2,878,084 | Bermingham | Mar. 17, 1959 |

FOREIGN PATENTS

| | | |
|---|---|---|
| 546,260 | Great Britain | July 3, 1942 |
| 800,550 | Germany | Nov. 13, 1950 |